A. M. KINDWALL.
VEHICLE SPRING.
APPLICATION FILED DEC. 29, 1909.

960,178.

Patented May 31, 1910.

Witnesses

Inventor
Abel M. Kindwall.
By C. A. Snow & Co.
Attorneys

UNITED STATES PATENT OFFICE.

ABEL M. KINDWALL, OF MINOT, NORTH DAKOTA.

VEHICLE-SPRING.

960,178.      Specification of Letters Patent.      Patented May 31, 1910.

Application filed December 29, 1909. Serial No. 535,423.

*To all whom it may concern:*

Be it known that I, ABEL M. KINDWALL, a citizen of the United States, residing at Minot, in the county of Ward and State of North Dakota, have invented a new and useful Vehicle-Spring, of which the following is a specification.

This invention has for its object to provide an improved spring support for the body of automobiles and other vehicles, a spring being employed which is so constructed and arranged that it lessens the jar to an extent which enables the vehicle to be equipped with solid tires, thus dispensing with pneumatic tires, and thereby eliminating punctures and other tire troubles.

The invention also has for its object to provide a spring of great strength and durability, so that it will support heavy loads on rough roads without danger of breaking.

With these objects in view, the invention consists in a novel construction and arrangement of parts to be hereinafter described and claimed, reference being had to the accompanying drawing forming a part of this specification, in which drawing,—

Figure 1:
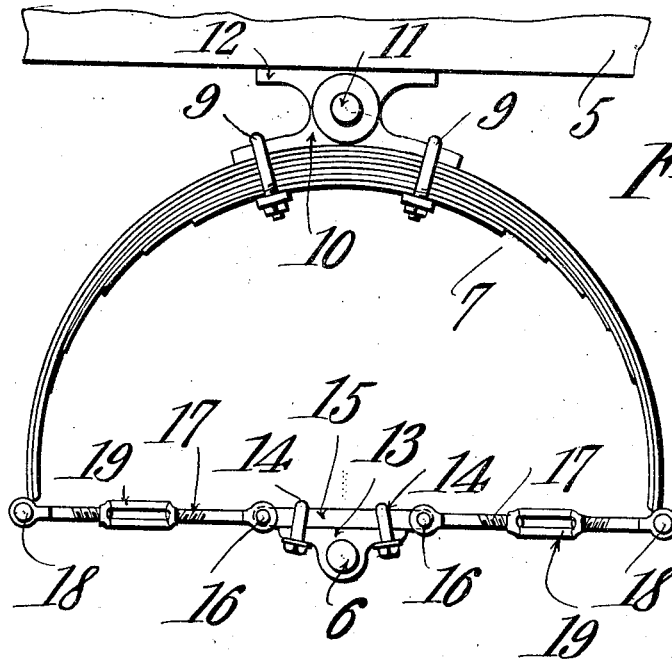
Figure 2:
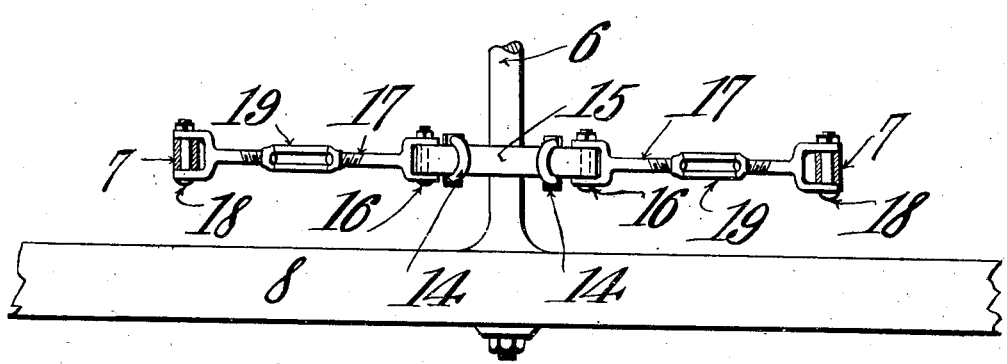

Figure 1 is a side elevation of the spring and its attaching means. Fig. 2 is a plan view thereof, the spring being shown partly broken away.

In the drawing, 5 denotes the body of the vehicle to which the invention is applied, and 6 denotes one of the axles. The spring for supporting the body on the axle is indicated at 7, and one of the wheels is shown at 8. It will be understood that the vehicle body is spring-supported on both sides on each axle, the several springs and their associate parts being alike, in view of which only one of such has been illustrated, and will be described.

The spring 7 is substantially semi-circular in form, and is fastened intermediate its ends by means of clips 9 to the body hanger 10, the latter being pivotally connected at 11 to a bracket 12 mounted on the bottom of the body 5.

On the axle 6 is a seat 13 to which is fastened by clips 14 a block 15 extending transversely of the axle, and having pivotally connected to its outer ends by bolts or pins 16, one end of links 17, the other ends of said links being pivotally connected by bolts or pins 18 to the ends of the springs 7. The links are in two sections connected by turn buckles 19. The ends of the spring are located on opposite sides of the axle, and the links extend in opposite directions from the axle to said ends. The turn buckles 19 are provided for the purpose of lengthening or shortening the links 17, and thus adjusting the tension of the spring to the load.

By mounting the spring as herein described the upward motion compresses the spring the same as the downward motion, and the jar is lessened to such an extent that pneumatic tires may be dispensed with, and solid tires used instead. The spring is also sufficiently strong to support heavy loads on rough roads without danger of breaking.

What is claimed is:—

The combination with a vehicle body and running gear, of a spring pivotally connected intermediate its ends to the body, and links pivotally connected at their ends to the running gear and to the ends of the spring.

In testimony that I claim the foregoing as my own, I have hereto affixed my signature in the presence of two witnesses.

ABEL M. KINDWALL.

Witnesses:
    ED. CHRISTENSEN,
    E. R. SLENGELSTAD.